United States Patent
Sapkota et al.

(10) Patent No.: US 11,894,681 B2
(45) Date of Patent: Feb. 6, 2024

(54) SYSTEM AND METHOD FOR POWER OSCILLATION DAMPING IN A POWER GENERATING SYSTEM

(71) Applicant: General Electric Company, Schenectady, NY (US)

(72) Inventors: Bishnu Sapkota, Niskayuna, NY (US); Alfredo Sebastian Achilles, Niskayuna, NY (US); Il-Do Yoo, Andover, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/492,048

(22) Filed: Oct. 1, 2021

(65) Prior Publication Data
US 2023/0104828 A1   Apr. 6, 2023

(51) Int. Cl.
*H02J 3/24* (2006.01)
*G05B 19/042* (2006.01)
*H02J 3/38* (2006.01)

(52) U.S. Cl.
CPC .............. *H02J 3/24* (2013.01); *G05B 19/042* (2013.01); *H02J 3/381* (2013.01); *G05B 2219/2619* (2013.01); *H02J 2300/28* (2020.01)

(58) Field of Classification Search
CPC .......... H02J 3/24; H02J 3/381; H02J 2300/28; G05B 19/042; G05B 2219/2619
See application file for complete search history.

(56) References Cited

U.S. PATENT DOCUMENTS

| | | | |
|---|---|---|---|
| 7,224,081 B2 | 5/2007 | Larsen | |
| 9,043,040 B2 | 5/2015 | Ray et al. | |
| 9,203,333 B2 | 12/2015 | Larsen et al. | |
| 9,318,988 B2 | 4/2016 | Larsen et al. | |
| 9,385,533 B2 | 7/2016 | Chaudhuri | |
| 9,478,987 B2 | 10/2016 | Nelson | |

(Continued)

FOREIGN PATENT DOCUMENTS

EP    3 779 180 A1    2/2021

OTHER PUBLICATIONS

NERC (North America Electric Reliability Corporation), Integrating Inverter-Based Resources into Low Short Circuit Strength Systems, Reliability Guideline, Atlanta, GA, Dec. 2017, 47 pages.

(Continued)

*Primary Examiner* — Charles Cai
(74) *Attorney, Agent, or Firm* — Dority & Manning, P.A.

(57) ABSTRACT

A system and method are provided for damping power system oscillations in a power system network having one or more local inverter-based generators within a plant, the plant connected to a grid at a point of intersection (POI). The system and method include a plant-level controller or local controller that receives one or more grid signals having a characteristic indicative of a power system oscillation. The plant-level controller or local controller generates an auxiliary signal from the grid signals that is used by the local controller of the inverter-based generators. At the local controller, the auxiliary signal is used to modulate reactive power output from the inverter-based generator to change a voltage at the POI, the voltage change damping the power system oscillations.

22 Claims, 9 Drawing Sheets

(56) References Cited

U.S. PATENT DOCUMENTS

| | | | | |
|---|---|---|---|---|
| 2011/0109085 A1* | 5/2011 | Nelson | ............... | H02P 9/102 |
| | | | | 290/44 |
| 2014/0361537 A1 | 12/2014 | Anderson et al. | | |
| 2015/0061290 A1* | 3/2015 | Larsen | ............... | F03D 9/257 |
| | | | | 290/44 |
| 2016/0268940 A1* | 9/2016 | Achilles | ............... | H02P 9/00 |
| 2019/0214821 A1* | 7/2019 | Burra | ............... | F03D 7/048 |

OTHER PUBLICATIONS

The EP Search Report for EP application No. 22199136.7, dated Feb. 20, 2023, 10 pages.

* cited by examiner

SYSTEM AND METHOD FOR POWER OSCILLATION DAMPING IN A POWER GENERATING SYSTEM

FIELD

The present disclosure relates in general to power generating systems, and more particularly to systems and methods for power oscillation damping in wind turbines or wind plants.

BACKGROUND

Wind power is considered one of the cleanest, most environmentally friendly energy sources presently available, and wind turbines have gained increased attention in this regard. Existing electrical power distribution systems (e.g., electrical grids) can be utilized for distributing power from renewable energy sources, such as wind, if control systems and methodologies are utilized to coordinate power produced by the renewable energy sources, the power demand on the power distribution systems, and the power consumed based on the varying operational states that are inherent with respect to renewable energy sources. For example, the operational state of a wind turbine can vary based on wind speeds or the absence of wind.

Wind power (and other renewable energy resources) are asynchronously connected to existing power distribution systems at a point of intersection (POI). These types of resources are referred to as "inverter-based" or "non-synchronous" resources. As more and more of these resources are connected to the utility grid system and integrated with conventional synchronous resources, grid operators are faced with system reliability and stability issues such as voltage control, frequency response, ramping, etc.

A power system in general is a complex network comprised of numerous generators, transmission lines, a variety of loads and transformers. In general terms, power system stability is defined as the ability of the power system to return to a normal state after a disturbance, such as a fault, a loss of a generator, or a sudden increase in power loading which results in power oscillations in the power system. A strong grid provides a stable reference for the power-generating resources. However, a weak grid presents challenges for connecting the inverter-based resources, which rely on a sufficient grid strength for synchronization. With increased penetration and integration of inverter-based resources in the grid, the total damping contribution from the synchronous machines may become insufficient, resulting in an unstable operation of the grid following disturbances that trigger the oscillations.

Small signal stability is a power system stability issue related to low frequency oscillations between generator rotors. When the power system is heavily loaded, it often exhibits multi-mode oscillations because machine rotors, behaving as rigid bodies, oscillate with respect to one another using the electrical transmission lines between them to exchange energy. These oscillations generally lie in a frequency range between 0.1-3.0 Hz. The oscillations in this frequency range are generally analyzed in two main oscillation modes: 1) a local mode in the range of 1 to 3 Hz; and 2) an inter area mode in the range of 0.1 to 1 Hz.

With respect to wind farms in particular, connection of these renewable energy plants to the grid can include relatively long high-voltage transmission lines due to the remote locations in which these plants might be located. In addition, wind farms may be connected to weak grids. Such grids are sensitive to any kind of power or voltage oscillations, especially if large plants are connected to the same line. Further, power oscillations induced by wind farms can cause oscillations of the connected components. In some instances, grid utilities request such power oscillations to be reduced as low as possible, or may even prohibit connection of all available wind turbines in a wind farm so as to maintain the power oscillations below a certain level.

Thus, a need exists for an improved methodology and system for power oscillation damping with a fast response that enhances the control capabilities of the wind plant by providing damping to the electromechanical modes of oscillation in the range of 0.1 Hz to 3.0 Hz, thereby making it possible for higher penetration of inverter based resources.

BRIEF DESCRIPTION

Aspects and advantages of the invention will be set forth in part in the following description, or may be obvious from the description, or may be learned through practice of the invention.

In one aspect, the present disclosure is directed to a method for damping power system oscillations in a power system network having one or more inverter-based generators within a plant, wherein the plant is connected to an electrical grid at a point of intersection (POI). The method includes, at a plant-level controller, receiving one or more grid signals having a characteristic indicative of a power system oscillation. At the plant-level controller, an auxiliary signal is generated from the grid signals and is transmitted to one or more of the inverter-based generators, in particular to the local controller configured with each of the inverter-based generators. At the local controller, the method includes using the auxiliary signal to modulate reactive power output from the inverter-based generator to improve damping of the power system oscillations.

In a particular embodiment, the inverter-based generators are wind turbine generators and the plant is a wind farm connected to the grid at the POI, the wind farm having a farm-level controller.

In an embodiment of the methodology, the voltage at the POI is changed in an increasing or decreasing direction to reduce the power system oscillations. In one embodiment, the voltage change may dampen power system oscillations within a range of 0.1 Hz to 3.0 Hz.

In a certain embodiment of the method, the grid signals are any one or combination of: active or reactive power flow in one or more grid transmission lines, current magnitude in one or more grid transmission lines, voltage magnitude or angle at the POI, voltage magnitude or angle at a remote bus, and grid frequency.

The method may include applying the auxiliary signal to a summing junction of a voltage regulator in the local controller.

In another embodiment, generation of the auxiliary signal at the plant-level controller includes applying a control process to limit a change in reactive power (ΔQ) utilized for damping to within a defined capacity percentage of the plant based on a short circuit ratio (SCR) value for the power system network. This embodiment may further include utilizing a switchable washout filter having at least two washout filters with different time constants upstream of the (ΔQ) limiter, wherein when the (ΔQ) limit is reached, output from the switchable washout filter is changed to the washout filter having a lower time constant.

Other embodiments of the method may include, at the plant-level controller, applying a filter/gain control process having a first filter stage for lead-lag compensation and a second filter stage for increased flexibility in controller tuning.

In still other embodiments, the local controller includes a voltage regulator that generates a reactive current command used for voltage regulation, the inverter-based generator having a defined maximum reactive current output. The auxiliary signal can be applied as an auxiliary voltage signal to the voltage regulator, wherein the method further includes applying a voltage limiter to the auxiliary voltage signal such that reactive power used for damping is limited so as not to exceed a terminal voltage limit of the inverter-based generator.

In a particular method embodiment, the local controller comprises a reactive power regulator and the auxiliary signal is applied as an auxiliary voltage signal to the reactive power regulator. This embodiment may include applying a reactive power limier to the auxiliary voltage signal.

The invention also encompasses a method for controlling an inverter-based generator to damp power system oscillations, wherein the inverter-based generator is in a plant that is connected to a grid at a point of intersection (POI). The method includes, at a local controller configured with the inverter-based generator, generating an auxiliary signal, wherein the auxiliary signal is generated from one or more grid signals having a characteristic indicative of a power system oscillation. At the local controller, the auxiliary signal is used to modulate reactive power output from the inverter-based generator to improve damping of the power system oscillations. In this embodiment, the inverter-based generator may be a wind turbine generator within a wind farm that includes a plurality of the wind turbine generators, wherein the wind farm connected to the grid at the POI. The auxiliary signal may be generated at a plant-level controller associated with the wind farm.

The invention also encompasses a method for controlling an inverter-based generator to damp power system oscillations, wherein the inverter-based generator is in a plant that is connected to a grid at a point of intersection (POI). The method includes, at a plant controller configured with the inverter-based generator, generating an auxiliary signal from one or more grid signals having a characteristic indicative of a power system oscillation. At the plant controller, the auxiliary signals are used to modify a reactive power command going to a local controller configured with the inverter-based generator to improve damping of the power system oscillations.

The present invention also encompasses a system for controlling a wind farm to dampen power system oscillations on an electrical grid, the wind farm having a plurality of wind turbines electrically connected to the electrical grid at a point of interconnection (POI). The system includes a generator and associated controller with each of the wind turbines, the wind turbine controllers having a processor for implementing a plurality of first operations. The system includes a farm-level controller communicatively coupled to each of the wind turbine controllers, the farm-level controller having a processor for implementing a plurality of second operations. These second operations include: receiving one or more grid signals having a characteristic indicative of a power system oscillation; generating an auxiliary signal from the grid signals; and transmitting the auxiliary signal to the wind turbine controllers. The first operations include at the wind turbine controllers: using the auxiliary signal to modulate reactive power output from the wind turbine generator to change a voltage at the POI, the voltage change damping the power system oscillations.

In an alternative system embodiment for controlling a wind farm to dampen power system oscillations on an electrical grid, wherein the wind farm has a plurality of wind turbines electrically connected to the electrical grid at a point of interconnection (POI), the system includes a generator and associated wind turbine controller configured with each of the wind turbines, the wind turbine controllers comprising a processor for implementing a plurality of first operations. A farm-level controller is communicatively coupled to each of the wind turbine controllers. The plurality of first operations performed by the wind turbine controllers includes: receiving one or more grid signals having a characteristic indicative of a power system oscillation; generating an auxiliary signal from the grid signals; and using the auxiliary signal to modulate reactive power output from the wind turbine generator to change a voltage at the POI, the voltage change damping the power system oscillations.

In still another embodiment of a system for controlling a wind farm to dampen power system oscillations on an electrical grid, the wind farm having a plurality of wind turbines electrically connected to the electrical grid at a point of interconnection (POI), the system includes a generator and associated wind turbine controller configured with each of the wind turbines. A farm-level controller is communicatively coupled to each of the wind turbine controllers, the farm-level controller comprising a processor for implement a plurality of first operations. These first operations include: receiving one or more grid signals having a characteristic indicative of a power system oscillation; generating an auxiliary signal from the grid signals; and using the auxiliary signal to modify a reactive power command transmitted to the wind turbine controllers to modulate reactive power output from the wind turbine generator to change a voltage at the POI, the voltage change damping the power system oscillations.

With any of the system embodiments, the farm-level controller or the local wind turbine controller may be configured to perform any one or combination of the damping steps or processes discussed above with respect to the various method embodiments.

In a particular system embodiment, the voltage change induced by the auxiliary signal is in an increasing or decreasing direction to dampen the power system oscillations. Although not limited in range, the voltage change may be used to dampen power system oscillations within a range of 0.1 Hz to 3.0 Hz.

In certain embodiments of the system, the grid signals are any one or combination of: active or reactive power flow in one or more grid transmission lines, current magnitude in one or more grid transmission lines, voltage magnitude or angle at the POI, voltage magnitude or angle at a remote bus, and grid frequency. The grid signals are received at the farm-level controller and the auxiliary signal may be generated from a weighted combination of the plurality of the grid signals.

In a particular configuration of the system, the wind turbine controller applies the auxiliary signal to a summing junction of a voltage regulator in the wind turbine controller.

In other embodiments, the farm-level controller or wind turbine is configured to apply a limiter to a change in reactive power ($\Delta Q$) utilized for damping to within a defined capacity percentage of the wind farm based on a short circuit ratio (SCR) value for the grid. In these embodiments, the farm-level controller may apply a switchable washout filter when generating the auxiliary signal, the switchable washout filter having at least two washout filters with different time constants upstream of the ($\Delta Q$) limiter. When the ($\Delta Q$)

limit is reached, output from the switchable washout filter is changed to the washout filter having a lower time constant.

In still other embodiments of the system, the farm-level controller or wind turbine controller is configured to apply a filter/gain control process in generating the auxiliary signal, the filter/gain process having a first filter stage for lead-lag compensation and a second filter stage for reducing torsional mode gains.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
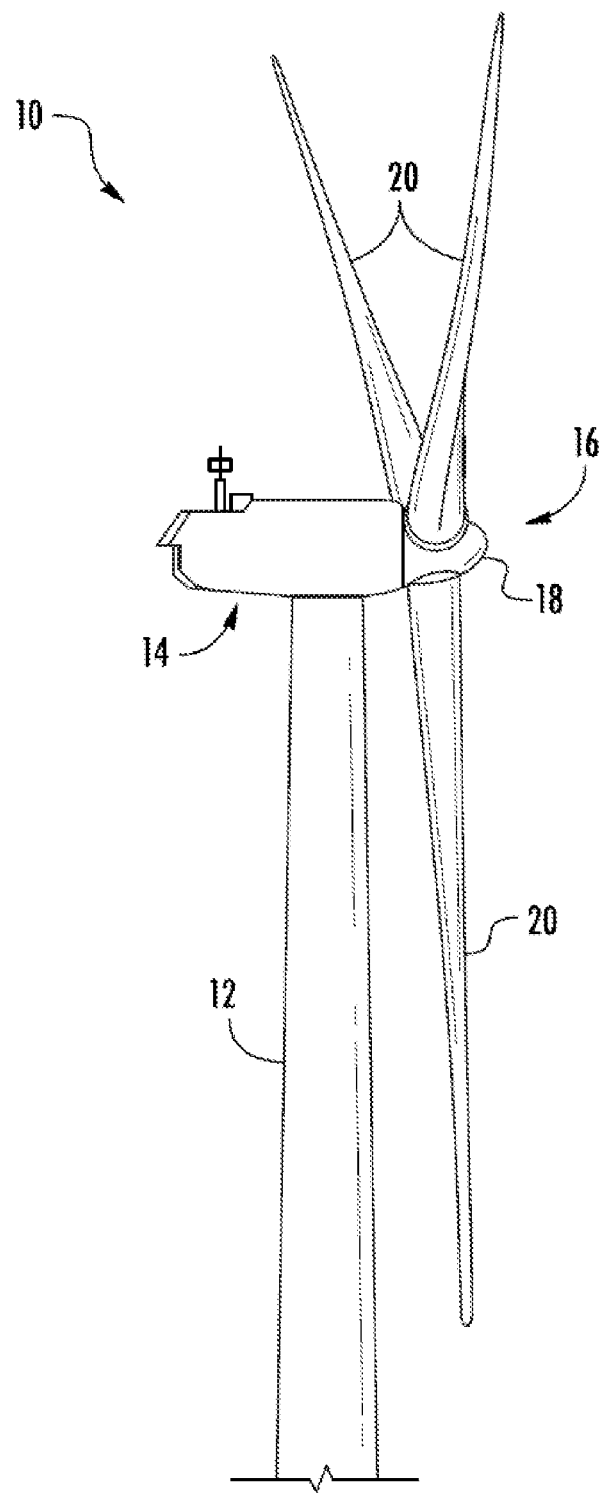
FIG. 1 illustrates a perspective view of a portion of a wind turbine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Figure 6:
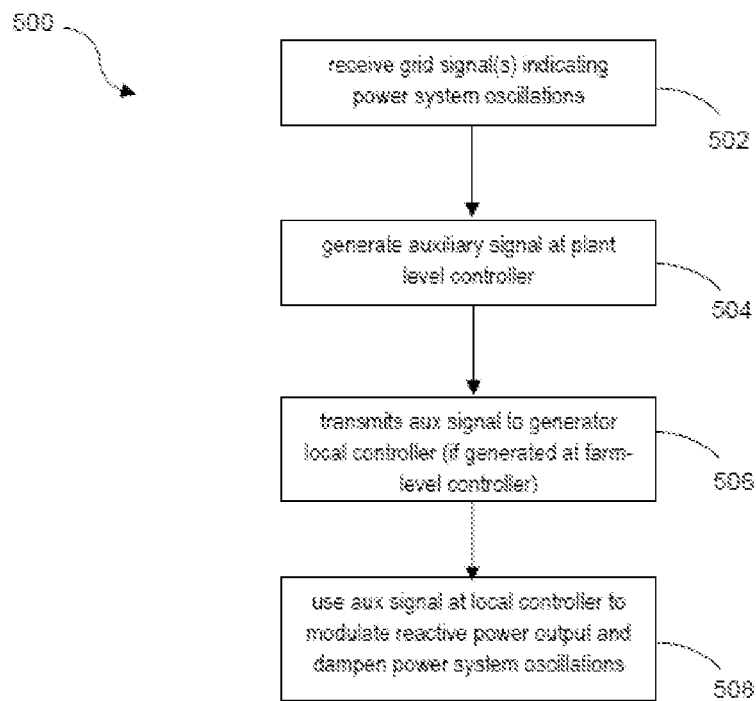
FIG. 6 illustrates a block diagram of a method for damping power system oscillations in accordance with aspects of the invention.

Referring to FIG. 6, generally, the present disclosure is directed to systems and methods 500 for damping power system oscillations in a power system network having one or more inverter-based generators within a plant, for example a plurality of wind turbine generators in a wind farm, wherein the plant is connected to an electrical grid at a point of intersection (POI). The method and system include step 502, wherein at a plant-level controller or at a local wind turbine controller the one or more grid signals having a characteristic indicative of a power system oscillation are received. At step 504, the plant-level controller or wind turbine controller generates an auxiliary signal from the grid signals. At step 506, if generated at the plant-level controller, the auxiliary signal is transmitted to the local controller configured with each of the inverter-based generators. At step 508, the local controller uses the auxiliary signal to modulate reactive power output from the inverter-based generator to change a voltage at the POI, the voltage change damping the power system oscillations.

Referring now to the figures, FIG. 1 depicts a perspective view of one embodiment of a wind turbine 10 according to the present disclosure. As shown, the wind turbine 10 generally includes a tower 12 extending from a support surface (not shown), a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to a generator 28 (FIG. 2) positioned within the nacelle 14 to permit electrical energy to be produced.

Figure 2:
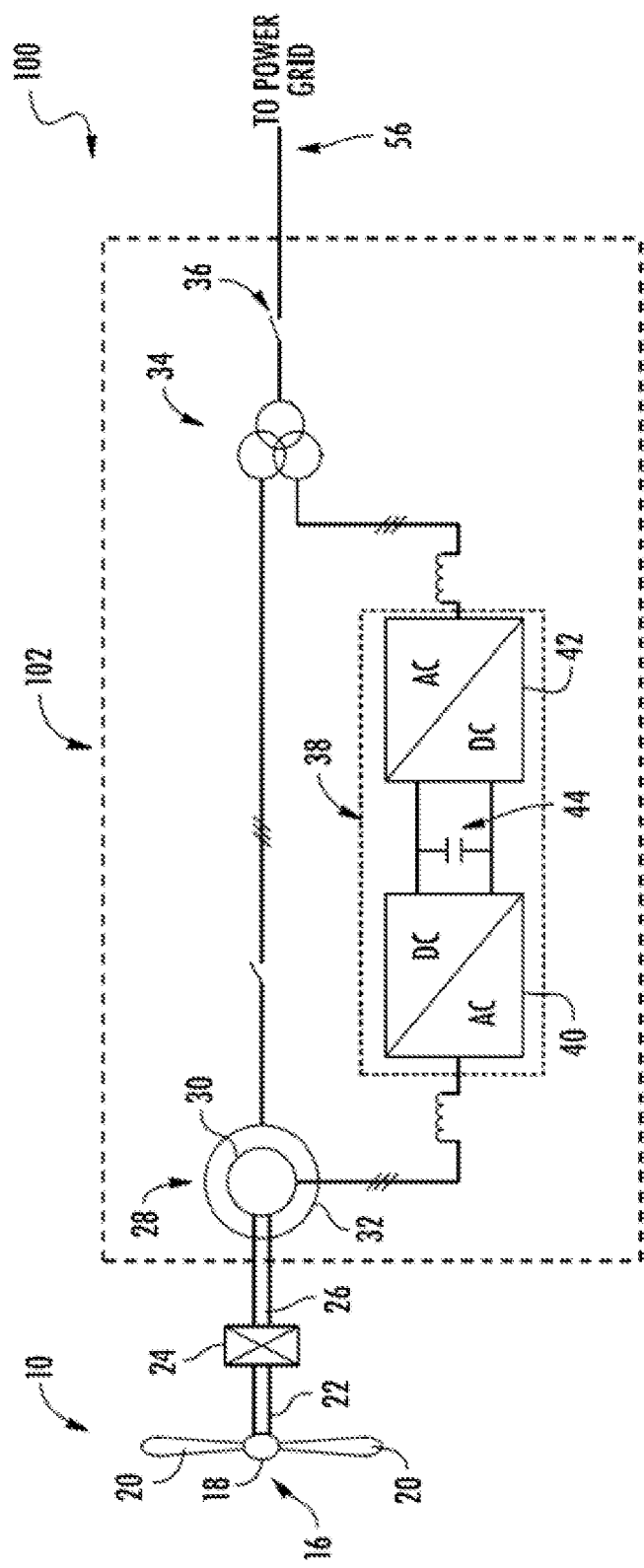
FIG. 2 illustrates a schematic diagram of an example of a wind turbine electrical power system suitable for use with the wind turbine shown in FIG. 1.

Referring now to FIG. 2, a wind turbine power system 100, which includes the wind turbine 10 and associated power generating system 102, is illustrated. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is connected to an electrical grid at a POI 56 via a grid breaker 36. Thus, the transformer 34 steps up the voltage amplitude of the electrical power such that the transformed electrical power may be further transmitted to the electrical grid.

In addition, as shown, the generator 28 may be electrically coupled to a bi-directional power converter 38 that includes a rotor-side converter 40 joined to a line-side converter 42 via a regulated DC link 44. The rotor-side converter 40 converts the AC power provided from the generator rotor 30 into DC power and provides the DC power to the DC link 44. The line side converter 42 converts the DC power on the DC link 44 into AC output power suitable for the electrical grid. Thus, the AC power from the power converter 38 can be combined with the power from the generator stator 32 to provide multi-phase power (e.g. three-phase power) having a frequency maintained substantially at the frequency of the electrical grid (e.g. 50 Hz/60 Hz).

Figure 7:
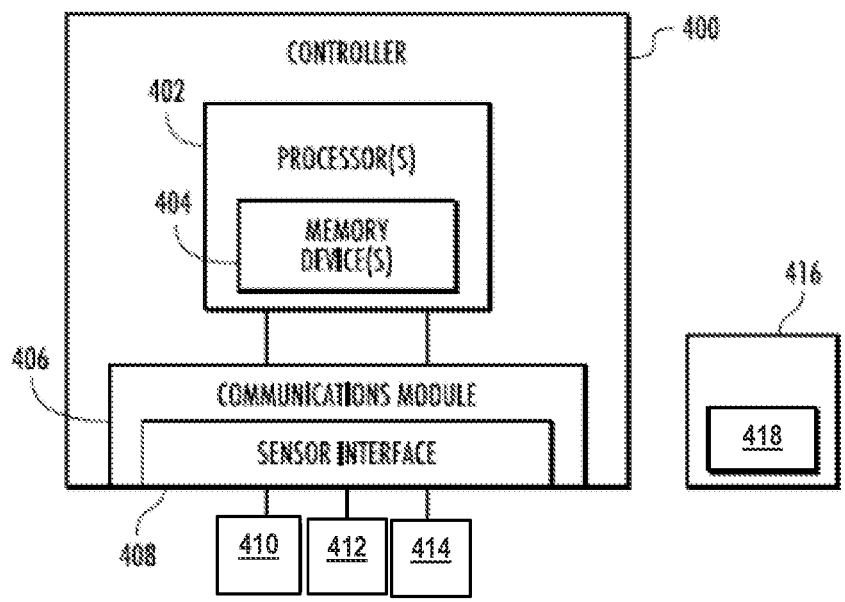
FIG. 7 illustrates a block diagram of an exemplary controller in accordance with aspects of the invention.
Figure 8:
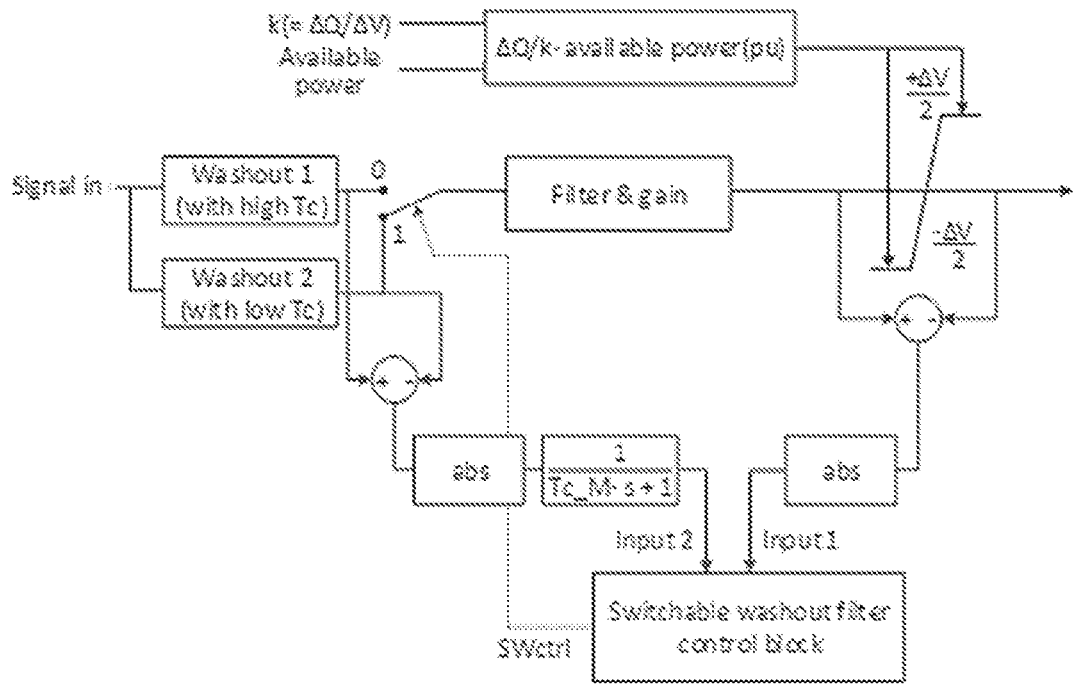
FIG. 8 illustrates a block diagram of an embodiment of a switchable washout filter and (ΔQ) limiter functionality of the POD control.

The power generating system 102 can include a turbine level controller 224 (shown in FIG. 3), such as the controller 400 shown in FIG. 8. Referring to FIG. 7, the controller 400 can include one or more processors 402 and associated memory device(s) 404 configured to perform a variety of computer-implemented functions (e.g., performing the methods, steps, calculations and the like and storing relevant data as disclosed herein). The memory device 404 may also store date relevant to certain characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Additionally, the controller 400 may include a communications module 406 to facilitate communications between the controller and the various components of the wind turbine power system 100, the wind farm 200 and/or the farm-level controller 226, including communication between farm-level controller 226 and turbine-level controller 224. Further, the communications module 406 may include a sensor interface 408 (e.g., one or more analog-to-digital converters) to permit signals transmitted from one or more sensors 410, 412 and 414 to be converted into signals that can be understood and processed by the processors 402. Sensors 410, 412 and 414 can be used to measure, ascertain or gather data regarding characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Still referring to FIG. 7, the controller 400 can also include a user interface 416. The user interface 416 can have various configurations and controls can be mounted or in user interface 416. The user interface 416 can also be located within the geographic area of the wind farm 200, or any portion thereof, or can be located remotely from the wind farm 200, or any portion thereof. The user interface 416 can include an input component 418. Input component 418 can be, for instance, a capacitive touch screen. The input component 418 can allow for the selective activation, adjustment or control of farm-level controller 226 and turbine controller 224, as well as any timer features or other user adjustable inputs. One or more of a variety of electrical, mechanical or electro-mechanical input devices, including rotary dials, push buttons, and touch pads, can also be used singularly or in combination as input component 418. The user interface 416 can include a display component, such as a digital or analog display device designed to provide operation feedback to a user.

It should be appreciated that the sensors 410, 412 and 414 may be communicatively coupled to the communications module 406 using any suitable means. For example, the sensors 410, 412 and 414 may be coupled to the sensor interface 408 via a wired connection. However, in other embodiments, the sensors 410, 412 and 414 may be coupled to the sensor interface 408 via a wireless connection, such as by using any suitable wireless communications protocol known in the art. As such, the processor 402 may be configured to receive one or more signals from the sensors 410, 412 and 414. Sensors 410, 412 and 414 can be part of or included with one or more of the other controllers associated with one or more of the wind turbine power systems 100 and/or the wind farm 200. Sensors 410, 412 and 414 can also be located within the geographic area of the wind farm 200, or any portion thereof, or can be located remotely from the wind farm 200, or any portion thereof.

It should also be understood that sensors 410, 412 and 414 can be any number or type of voltage and/or electric current sensors may be employed within the wind turbine power systems 100 and at any location. For example, the sensors may be current transformers, shunt sensors, Rogowski coils, Hall Effect current sensors, Micro Inertial Measurement Units (MIMUs), or similar, and/or any other suitable voltage or electric current sensors now known or later developed in the art. Thus, the one or more controllers, such as farm-level controller 226 and turbine controller 224, are configured to receive one or more voltage and/or electric current feedback signals from sensors 410, 412 and 414.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 402 is also configured to compute advanced control algorithms and communicate to a variety of Ethernet or serial-based protocols (Modbus, OPC, CAN, etc.). Additionally, the memory device(s) 404 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

Figure 3:
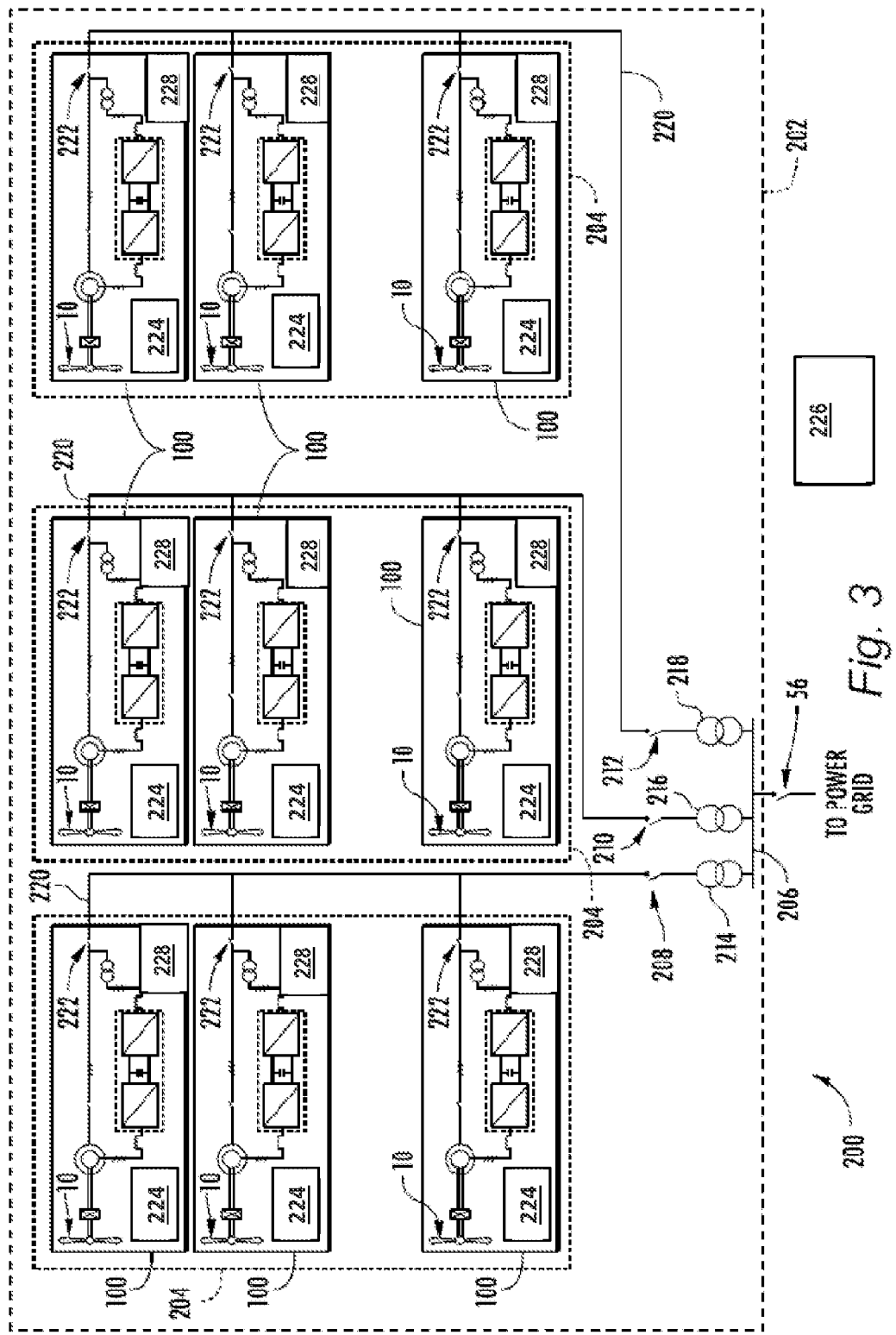
FIG. 3 illustrates a control diagram of a wind turbine generator control system in accordance with aspects of the present invention.

Referring particularly to FIG. 3, a schematic diagram is provided of an example of a power system network embodied as a wind farm 200. More specifically, as shown, the wind farm 200 can include a plurality of wind turbine power systems 100, connected to an electrical grid via a point of intersection (POI) 56. The wind farm 200 may include at least two clusters 204 to form an electrical power system.

Individual wind turbine power systems 100 including of a plurality of wind turbines 10 may be arranged in predetermined geographic locations and electrically connected together to form a wind farm plant 202.

The electrical power associated with each wind turbine power system 100 can be transmitted to a main line 206 via one or more cluster lines 220. Each wind turbine power system 100 can be connected or disconnected to the one or more cluster lines 220 via one or more switches 222 or breakers. Wind turbine power systems 100 may be arranged into a plurality of groups (or clusters) 204 with each group separately connected to a main line 206 via switches 208, 210, 212, respectively. Thus, as shown, each cluster 204 may be connected to a separate transformer 214, 216, 218 via switches 208, 210, 212, respectively, for stepping up the voltage amplitude of the electrical power from each cluster 204 such that the transformed electrical power may be further transmitted to the electrical grid. In addition, as shown, the transformers 214, 216, 218 are connected to a main line 206 that combines the voltage from each cluster 204 before sending the power to the grid via a POI 56. The POI 56 can be a breaker, switch or other known method of connection to an electrical grid.

Each wind turbine power system 100 can include a voltage regulator 228 (i.e., a wind turbine terminal voltage regulator) that regulates the voltage which is output by each wind turbine power system 100. Further, the voltage regulator 228 can be in electrical communication with turbine controller 224 or farm-level controller 226. Thus, the turbine-level controller 224 or farm-level controller 226 can deliver a voltage regulator gain command (VCMD) to one or more of the voltage regulators 228 which in turn dictates the amount of power distributed to the POI 56 via cluster lines 220.

Each wind turbine power system 100 includes one or more controllers, such as turbine-level controller 224 described above. The turbine controller 224 can be located on or within each wind turbine 10 or can be located remotely from each wind turbine 10. The turbine controller 224 can be part of or included with one or more of the other controllers associated with wind turbine power system 100 and/or the wind farm 200. The turbine controller 224 operates switches 222 to connect or disconnect the one or more wind turbine power systems 100 from the cluster lines 220 and control the voltage regulator 228, such as the voltage regulator gain, based at least in part on the power required at the POI 56, and/or based, at least in part, on characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

The wind farm plant 200 can include one or more farm-level controllers 226 configured to control the components of the wind farm 200, including switches 208, 210 and 212, voltage regulators 228, communicate with one or more other controllers, such as turbine-level controllers 224, and/or implement some or all the method steps as described herein. The farm-level controller 226 can be located within the geographic area of the wind farm 200, or any portion thereof, or can be located remotely from the wind farm 200, or any portion thereof. The farm-level controller 226 can be part of or included with one or more of the other controllers associated with one or more of the wind turbine power systems 100 and/or the wind farm 200. Each of the clusters 204, wind turbine power systems 100, or turbine-level controllers 224, may be communicatively coupled with a farm-level controller 226.

The farm-level controller 226 generates and sends control signals to turbine controller 224 to operate switches 222 to connect or disconnect the one or more wind turbine power systems 100 from the cluster lines 220 based at least in part on the power required at the POI 56. The farm-level controller 226 can generate and send control signals to switches 208, 210 and/or 212 and/or voltage regulators 228 to regulate the power delivered to the POI 56, based at least in part on the power required at the POI 56, and/or based, at least in part, on characteristics of the wind turbine power system 100, wind farm 200, and/or characteristics of the wind turbines 10 (e.g., wind turbine size, location, age, maintenance status), the electrical grid (e.g., strength or condition of the grid, strength or condition of the connection of the wind farm or wind turbine to the grid, grid architecture, grid location), the load on the grid (e.g., loads that are heavy or variable) and/or the environmental conditions (e.g., the wind conditions for the one or more wind turbines).

Figure 4A:
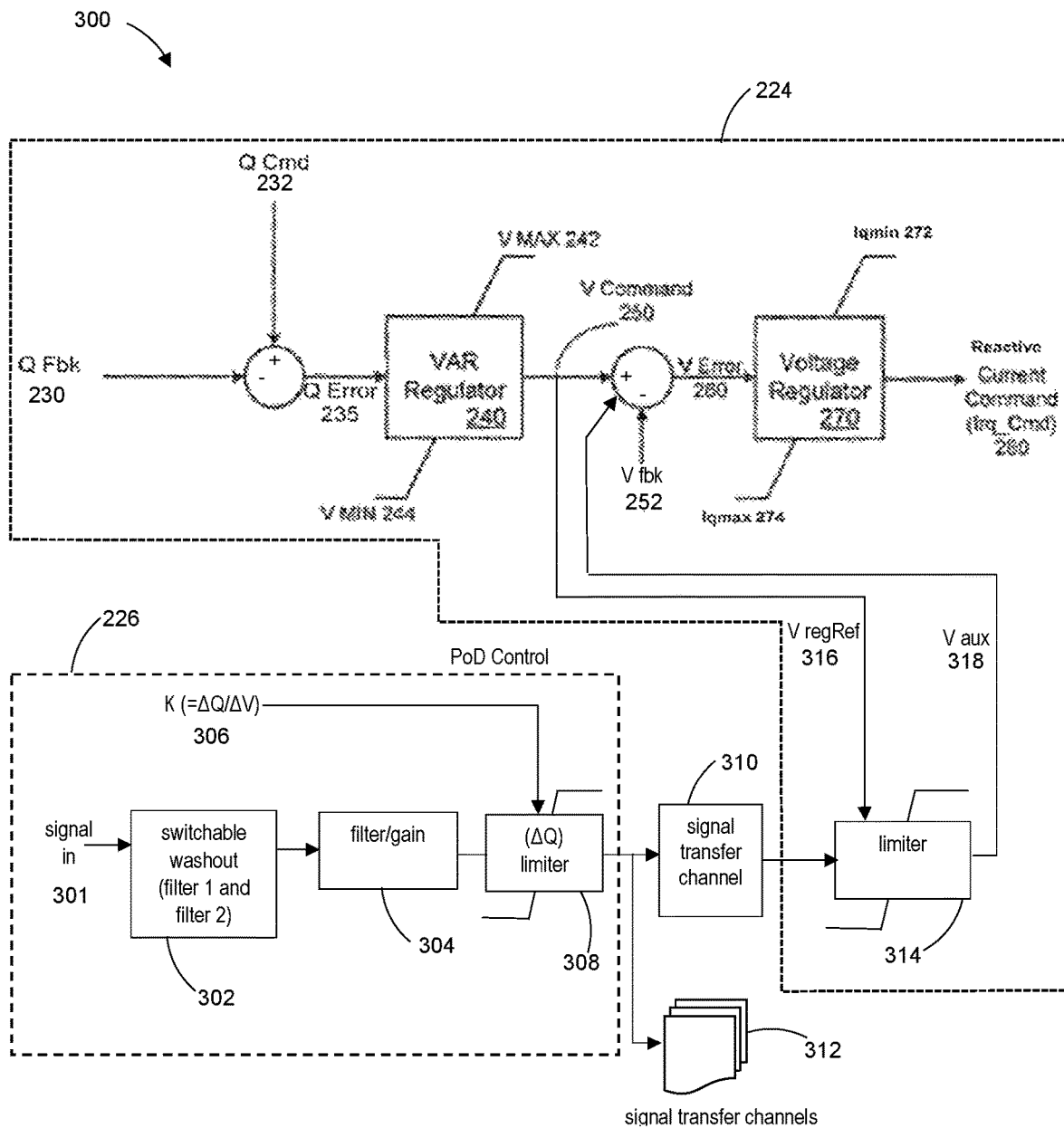
FIGS. 4a through 4c illustrate block diagrams of different wind turbine and farm-level controller configurations in accordance with aspects of the invention.

FIG. 4a depicts wind turbine control operations integrated with power system oscillation damping control 300 in accordance with aspects of the invention. In this embodiment, certain aspects of the damping control 300 are carried out by the wind turbine controller (local controller) 224 and other aspects are carried out by the farm-level controller 226 (controllers 224, 226 indicated by dashed lines). A requirement with this control system is to maintain a reasonable balance of reactive power from all of the wind turbine generators within the wind farm. For most applications, this may be accomplished with the system of FIG. 4a by relying essentially solely on the impedances of the respective wind turbine transformers 34 (FIG. 2).

Referring to FIG. 4a, a local Q command signal (Q Cmd) 232 may be generated by the local controller 224 and indicates desired reactive power at the generator terminals, for example in the event that the wind turbine generator is in manual mode or otherwise not in communication with the wind farm controller 226. The Q Cmd signal 232 is combined with a Q Fbk signal 230 indicative of the individual wind turbine's actual reactive power output to produce a Q Error signal 235 that is supplied to a VAR (Q) regulator 240. This VAR regulator 240 generates the limited V command 250 that is compared to a measured terminal voltage signal V fbk 252 to generate the voltage error signal 260 (V Error) input to the voltage regulator 270.

Based on voltage error signal 260 (V Error), the voltage regulator 270 generates reactive current command 280 (Irq_Cmd), which is used to control generator current. In one embodiment, voltage regulator 270 is a PI controller that has a closed-loop time constant of approximately 50 milliseconds. Other types of controllers can also be used, for example, PD controllers, PID controllers, etc. Other time constants can be used (e.g., 1 second, 20 milliseconds, 75 milliseconds, 45 milliseconds) for voltage regulator 270.

In general, there are two components of a generator current command: the real power component denoted as Id_Cmd and the reactive power component denoted as Irq_Cmd 280. The current command 280 generated as described above is the reactive component (Irq_Cmd) of the current command. The real component or Id_Cmd can be generated in any manner known in the art. Reactive current command 280 is limited by Iq max 272 and Iq min 274. The values for Iq max 272 and Iq min 274 can be based on generator current ratings. For example, Iq max 272 can be set to a percentage of rated current for the generator and Iq min 274 can be set to −Iq max. Alternate limits can also be used.

The current command 280 is used by the wind turbine generator controller 224 for generating reactive power based on the current commands.

Still referring to FIG. 4a, the power oscillation damping (POD) control aspects 300 are utilized in the wind turbine generator control by changing the voltage at the POI in a direction to damp out power oscillations.

The POD control functions in FIG. 4a includes a limiter 314 in the turbine control side, a ΔQ limiter 308, and filters 304 in the farm (plant) control side, and communication channel(s). The POD control generates the auxiliary signal in the form of a supplemental voltage signal after applying control actions to frequency, voltage, or current input signal 301 sensed at the POI 56 (FIG. 3). The POD output auxiliary signal is restricted by limiter 314 to the limitation of the wind turbine generator terminal voltage output in the converter control block. Signal transfer channel 310 refers to a communication channel between farm (plant) controller and the converter controller. In particular embodiments of the method and system, the POD functionality damping operation with the range of 0.1~3.0 Hz. Table 1 summarizes objective and operation for each functional block of the POD system:

k (system SCR≈ΔQ/ΔV) must be entered. In FIG. 8, the limiter values, +/−ΔV are used for this purpose and they are calculated based on ΔQ/k, wherein "k" is a user input parameter corresponding to the system SCR (~ΔQ/ΔV). From a given k, ΔV is obtained as below. In the formula for calculating ΔV, the term of "no. of turbines online" corresponds to how many units are currently in service. This to limit ΔQ from each unit for POD within 2~3% of a unit capacity:

$$\Delta V \approx \frac{0.03\ (3\%\ of\ WTG\ capacity)}{k} \cdot \frac{no.\ turbines\ online}{total\ no.\ turbines}$$

Switchable washout 302: At the front stage of the control diagram in FIG. 4a, a switchable washout function is implemented by two washout filters (filters 1 & 2). The purpose of this block is to reduce the time for which the operating point stays in the saturation region and to maximize the utilization of the POD control in the saturation region. Two independent washout filters 1 & 2 having different time constants are run, and when the operating point hits the reactive power limit, the output is switched to the lower time constant output. The equations below show transfer functions of the washout filter 1 & 2.

TABLE 1

| Stage | Operation | Objective |
|---|---|---|
| Switchable washout | Count the time that operating point stays in saturation region and switch the output to another washout output with lower time constant | To reduce effect of saturation at POD output |
| ΔQ/ΔV input & ΔQ limiter | +/−ΔV limiter setting calculated based on k (≈ΔQ/ΔV) gain. User setting parameter of k(ΔQ/ΔV) gain corresponding to network SCR. | To limit ΔQ control range of POD within 2~3% |
| Filter & gain | lead-lag compensator with an extra stage. | lead-lag compensator for POD tuning. The $2^{nd}$ order filters provide more flexibility in tuning controller |
| Limiter @ converter control | POD operation range limit by converter terminal voltage limit | This limiter provides priority to voltage control loop in utilizing Q in voltage control |
| POD input | POD accepts signals of grid frequency, grid voltage, line current and power flow at a line | Selection of a signal or combining signal(s) among various gird quantities as needed |

The functional blocks of the POD control system in FIG. 4a (and summarized in Table 1 are discussed in greater detail below).

Limiter 314: The maximum WTG terminal voltage is limited to a certain level (in general, 1.1 pu at normal operation) and also should not go below a low limit (in general, 0.9 pu @ normal operation). The POD signal is a supplemental signal in the voltage control loop. The limiter of the POD output in the converter control gives control priority to the voltage control loop in utilizing the reactive power. The POD control uses remaining reactive power after applying the voltage control action before the reactive power output hits the maximum limit. The V regRef signal 316 in the signal path is used to calculate remaining reactive power, which is available reactive power for POD operation.

(ΔQ) limiter 308: Required reactive power at a given voltage command is affected by the system Short Circuit Ratio (SCR). Referring to FIG. 8, to limit ΔQ utilized by POD operation within 2~3% of the farm capacity, a proper $$\text{washout filter } 1(s) = \frac{Tc\_high \cdot s}{Tc\_high \cdot s + 1}$$

$$\text{washout filter } 2(s) = \frac{Tc\_low \cdot s}{Tc\_low \cdot s + 1}$$

Tc_high: time constant of washout filter 1 (high time constant)

Tc_low: time constant of washout filter 2 (low time constant)

Filter/gain 304: In FIG. 4a, the filter/gain functionality utilizes a 1st order filter stage (lead-lag stage) for lead-lag compensation to tune the POD control to network conditions and a second order filter to provide more flexibility in controller tuning.

Figure 9:
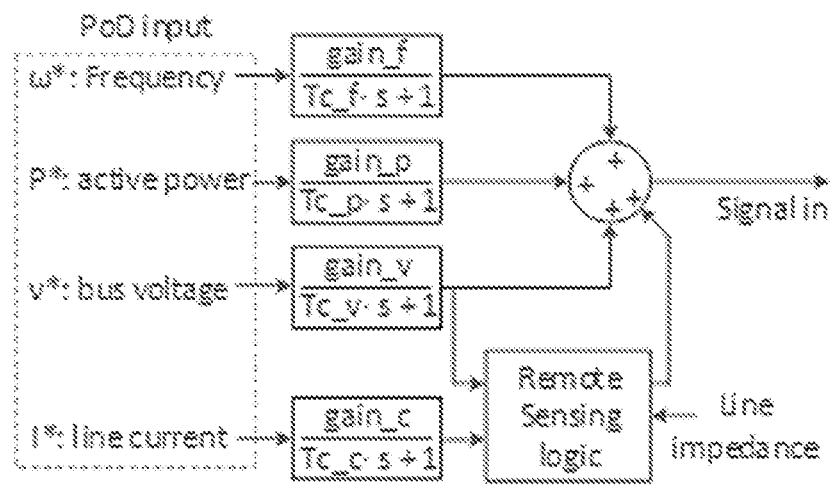
FIG. 9 illustrates a block diagram of an embodiment of an input signal functionality of the POD control.

POD input 301: Referring to FIGS. 4a and 9, the POD input 301 can be one or a combination of grid frequency, grid voltage, line current, or power flow at a line. In general, the signal that contains the most significant characteristic of targeted power oscillations is selected. In some cases, two inputs are combined with a weighting factor. FIG. 9 shows an exemplary input configuration for the POD control block. Remote sensing logic in the diagram refers to the calculation routine of voltage at a remote bus if required. The remote voltage can be obtained per the equation below.

$$I\text{sensing} = I \cdot (\cos(PF\ \text{angle}) + j \cdot \sin(PF\ \text{angle}))$$

$$V\text{ remote} = V\text{sensing} - I\text{sensing} \cdot (r\text{lin} + j \cdot x\text{lin})$$

Vsensing: voltage at remote bus in rms (pu)
rine, xlin: line impedance between buses
I: current at the line in rms (pu)

Figure 4B:
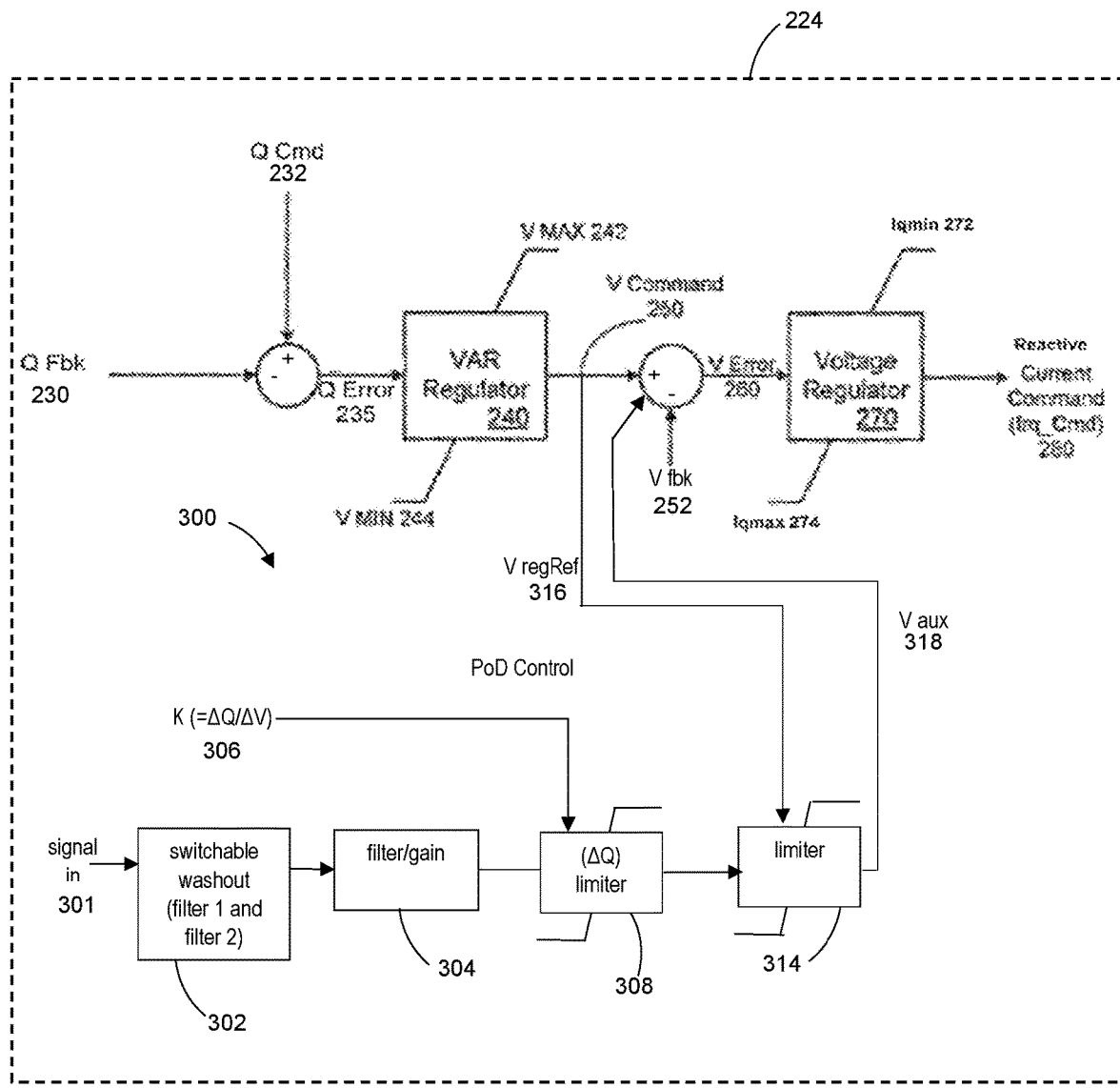

FIG. 4b depicts another embodiment of wind turbine control operations integrated with power system oscillation damping control 300 in accordance with aspects of the invention. In this embodiment, essentially all aspects of the damping control 300 are carried out by the wind turbine controller (local controller) 224. The discussion of the POD components and steps set forth above with respect to FIG. 4a applies to FIG. 4b with the appreciation that these steps are carried out by the local controller 224. The ΔQ limiter in the turbine control side is designated as 308 and limits the change in reactive power used for the damping function. The POD control generates the auxiliary voltage signal in the form of a supplemental voltage signal after applying control actions to frequency, voltage, or current input signal 301 sensed at the POI 56 (FIG. 3). The output auxiliary signal is restricted by the ΔQ limiter 308 in the turbine control side and the limiter 314 to the limitation of the wind turbine generator terminal voltage output.

Figure 4C:
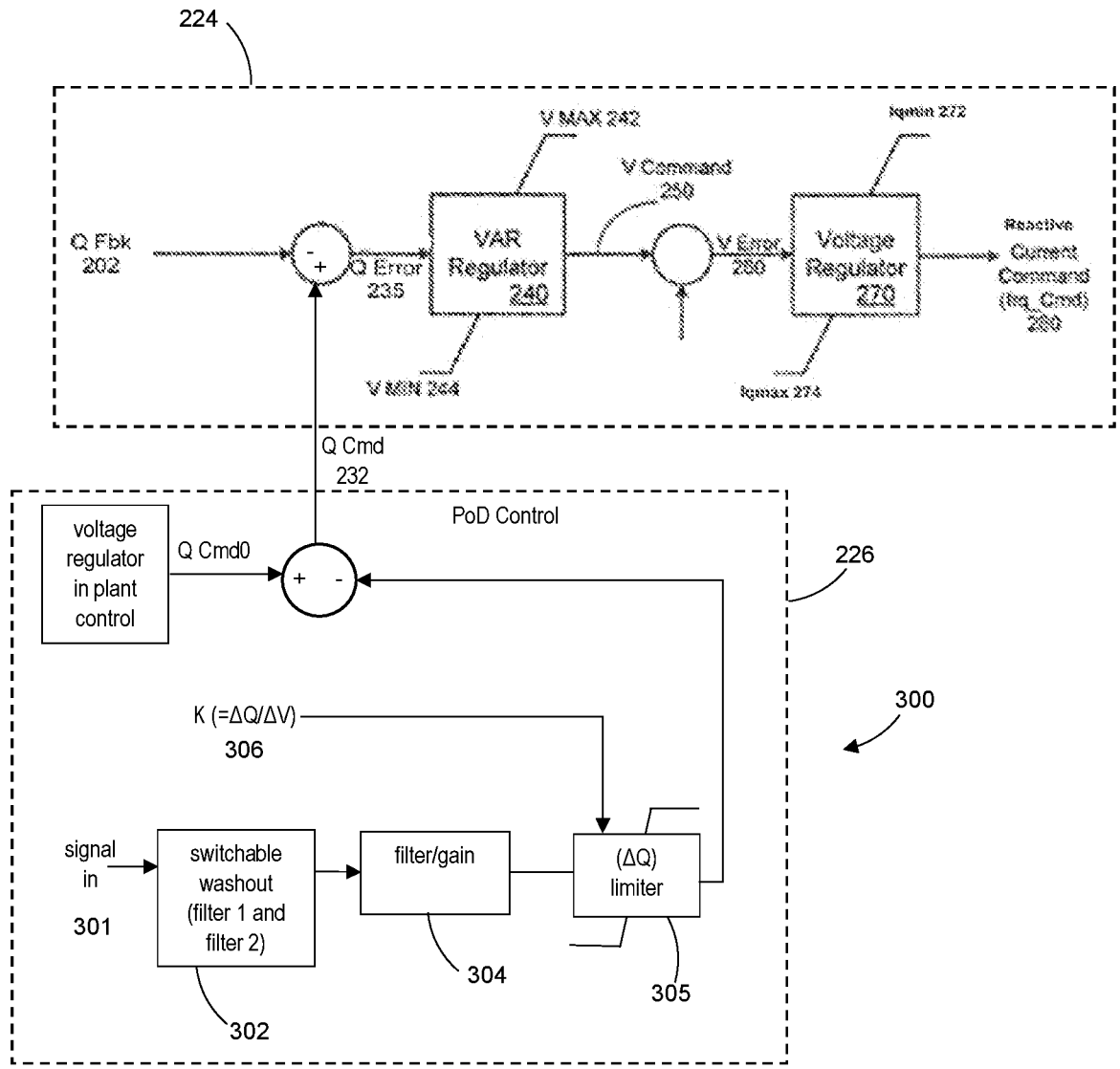

FIG. 4c depicts still another embodiment of wind turbine control operations integrated with power system oscillation damping control 300 in accordance with aspects of the invention. In this embodiment, essentially all aspects of the damping control 300 are carried out by the farm-level controller 226. The discussion of the POD components and steps set forth above with respect to FIG. 4a applies to FIG. 4c with the appreciation that these steps are carried out by the plant controller 226. A voltage regulator in the plant controller 226 generates an initial reactive power command (Q Cmd0) that is adjusted by the POD output signal (which is limited by the ΔQ limiter 305) to generate the Q Cmd signal 232 used by the turbine controller 224 as discussed above with respect to FIG. 4a.

Figure 5:
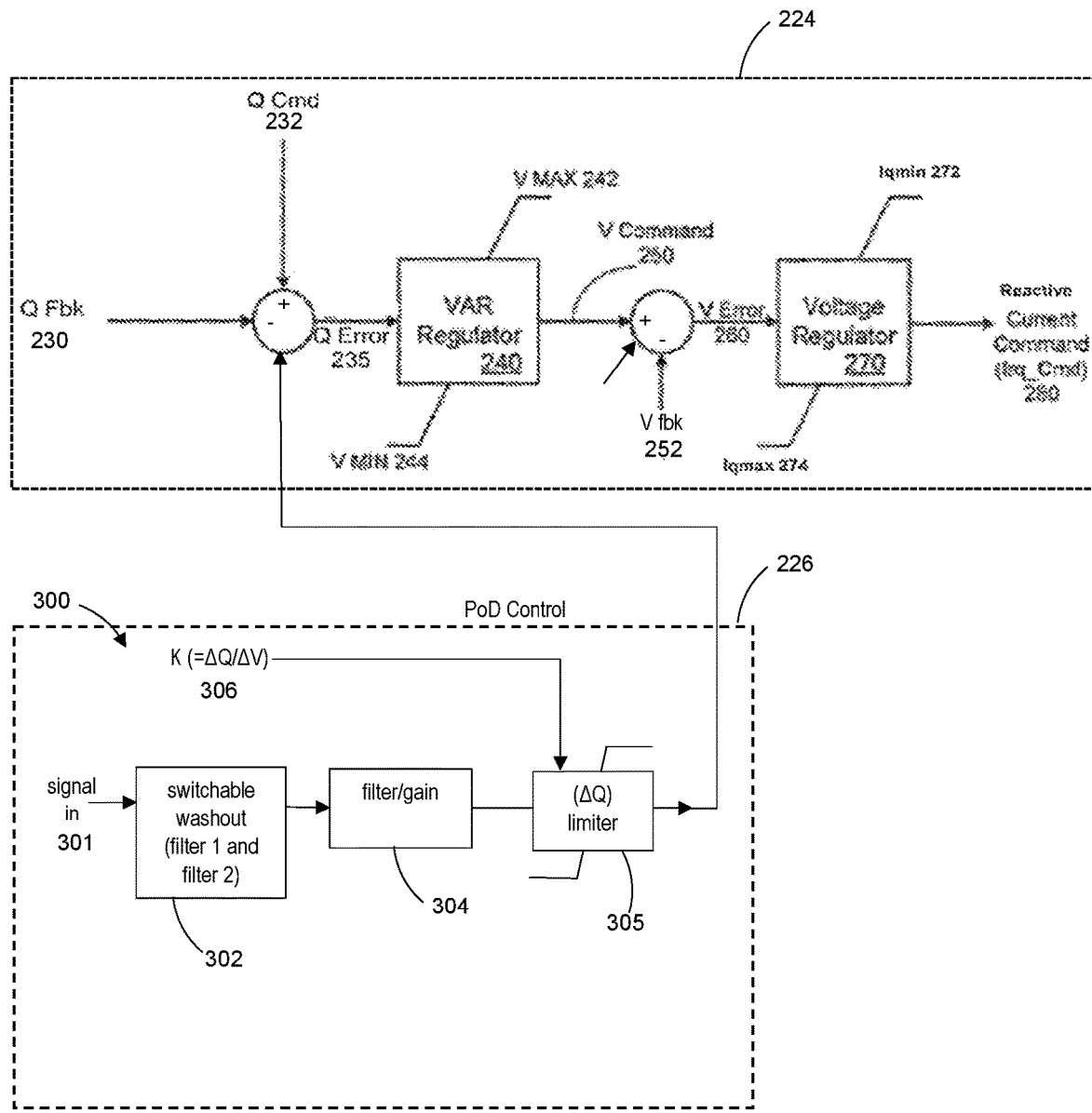
FIG. 5 illustrates a block diagram of still another controller configuration in accordance with aspects of the invention.

FIG. 5 is another alternative control system that provides a control structure involving both turbine and farm-level control that can perform farm-level voltage control performance with uniform reactive power output of the wind turbines. This embodiment incudes the WTG converter control block of FIG. 4a. The POD control differs from that of FIG. 4a in that the limiter 314 in the turbine control side is not present and the POD output voltage signal is used for generation of the Q Error signal 235. Specifically, the POD control block generates the auxiliary voltage signal after applying control actions to frequency, voltage, or current input signal 301 sensed at the POI 56 (FIG. 3). The auxiliary voltage signal is restricted by the (ΔQ) limiter 308 and is then input to the VAR regulator 240 via the summing junction where it is combined with the local Q command signal (Q Cmd) 232 indicating desired reactive power at the generator terminals and the Q Fbk signal 230 indicative of the individual wind turbine's actual reactive power output to produce a Q Error signal 235 that is supplied to a VAR (Q) regulator 240. The VAR regulator 240 generates the limited V Command 250 that is compared to a measured terminal voltage signal V fbk 252 to generate the voltage error signal 260 (V Error) input to the voltage regulator 270.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for damping power system oscillations in a power system network having one or more local inverter-based generators within a plant, the plant connected to a grid at a point of intersection (POI), the method comprising: at a plant-level controller, receiving one or more grid signals having a characteristic indicative of a power system oscillation; at the plant-level controller, generating an auxiliary signal from the grid signals; transmitting the auxiliary signal to a local controller of one or more of the inverter-based generators; and at the local controller, using the auxiliary signal to modulate reactive power output from the inverter-based generator to improve damping of the power system oscillations.

Clause 2: The method as in the preceding clause, wherein the inverter-based generators are wind turbine generators and the plant is a wind farm connected to the grid at the POI.

Clause 3: The method as in any preceding clause, wherein voltage at the POI is changed in an increasing or decreasing direction to reduce the power system oscillations.

Clause 4: The method as in any preceding clause, wherein the grid signals are any one or combination of: active or reactive power flow in one or more grid transmission lines, current magnitude in one or more grid transmission lines, voltage magnitude or angle at the POI, voltage magnitude or angle at a remote bus, and grid frequency.

Clause 5: The method as in any preceding clause, wherein a plurality of the grid signals are received at the plant-level controller, the auxiliary signal generated from a weighted combination of the plurality of the grid signals.

Clause 6: The method as in any preceding clause, wherein the auxiliary signal is applied to a summing junction of a voltage regulator in the local controller.

Clause 7: The method as in any preceding clause, wherein the generating of the auxiliary signal at the plant-level controller further comprises the plant level controller receiving capability limits an operating conditions of each of the inverter-based generators and adjusting the auxiliary signal to limit a change in reactive power (ΔQ) utilized for damping, wherein the limit is calculated and implemented at the plant level or at each of the inverter-based generators as a percentage of the reactive power capability of the plant or inverter-based generators.

Clause 8: The method as in any preceding clause, further comprising utilizing a switchable washout filter having at least two washout filters with different time constants upstream of the (ΔQ) limiter, wherein when the (ΔQ) limit is reached, output from the switchable washout filter is changed to the washout filter having a lower time constant.

Clause 9: The method as in any preceding clause, wherein the generating of the auxiliary signal at the plant-level controller further comprises applying a filter/gain control process having a first filter stage for lead-lag compensation and a second filter stage to provide increased flexibility in controller tuning.

Clause 10: The method as in any preceding clause, wherein the local controller comprises a voltage regulator that generates a reactive current command used for voltage regulation, the inverter-based generator having a defined maximum reactive current output, the auxiliary signal applied as an auxiliary voltage signal to the voltage regulator, and further comprising applying a voltage limiter to the auxiliary voltage signal such that reactive power used for damping is limited so as not to exceed a terminal voltage limit of the inverter-based generator.

Clause 11: The method as in any preceding clause, wherein the local controller comprises a reactive power regulator, the auxiliary signal applied as an auxiliary voltage signal to the reactive power regulator.

Clause 12: The method as in any preceding clause, further comprising applying a reactive power limier to the auxiliary voltage signal.

Clause 13: A method for controlling an inverter-based generator to damp power system oscillations, wherein the inverter-based generator is in a plant that is connected to a grid at a point of intersection (POI), the method comprising: at a local controller configured with the inverter-based generator, generating an auxiliary signal, wherein the auxiliary signal is generated from one or more grid signals having a characteristic indicative of a power system oscillation; and at the local controller, using the auxiliary signal to modulate reactive power output from the inverter-based generator to improve damping of the power system oscillations.

Clause 14: The method as in the preceding clause, wherein the inverter-based generator is a wind turbine generator within a wind farm having a plurality of the wind turbine generators, the wind farm connected to the grid at the POI.

Clause 15: A method for controlling an inverter-based generator to damp power system oscillations, wherein the inverter-based generator is in a plant that is connected to a grid at a point of intersection (POI), the method comprising: at a plant controller configured with the inverter-based generator, generating an auxiliary signal, wherein the auxiliary signal is generated from one or more grid signals having a characteristic indicative of a power system oscillation; and at the plant controller, using the auxiliary signal to modify a reactive power command going to a local controller configured with the inverter-based generator to improve damping of the power system oscillations.

Clause 16: The method in the preceding clause, wherein the inverter-based generator is a wind turbine generator within a wind farm having a plurality of the wind turbine generators, the wind farm connected to the grid at the POI.

Clause 17: The method as in any one of the preceding two clauses, wherein the plant controller is a wind farm controller.

Clause 18: A system for controlling a wind farm to dampen power system oscillations on an electrical grid, the wind farm having a plurality of wind turbines electrically connected to the electrical grid at a point of interconnection (POI), the system comprising: a generator and associated wind turbine controller configured with each of the wind turbines, the wind turbine controllers comprising a processor for implementing a plurality of first operations; a farm-level controller communicatively coupled to each of the wind turbine controllers, the farm-level controller comprising a processor for implementing a plurality of second operations, the plurality of second operations comprising: receiving one or more grid signals having a characteristic indicative of a power system oscillation; generating an auxiliary signal from the grid signals; transmitting the auxiliary signal to the wind turbine controllers; the plurality of first operations at the wind turbine controllers comprising: using the auxiliary signal to modulate reactive power output from the wind turbine generator to change a voltage at the POI, the voltage change damping the power system oscillations.

Clause 19: A system for controlling a wind farm to dampen power system oscillations on an electrical grid, the wind farm having a plurality of wind turbines electrically connected to the electrical grid at a point of interconnection (POI), the system comprising: a generator and associated wind turbine controller configured with each of the wind turbines, the wind turbine controllers comprising a processor for implementing a plurality of first operations; a farm-level controller communicatively coupled to each of the wind turbine controllers; the plurality of first operations comprising: receiving one or more grid signals having a characteristic indicative of a power system oscillation; generating an auxiliary signal from the grid signals; and using the auxiliary signal to modulate reactive power output from the wind turbine generator to change a voltage at the POI, the voltage change damping the power system oscillations.

Clause 20: A system for controlling a wind farm to dampen power system oscillations on an electrical grid, the wind farm having a plurality of wind turbines electrically connected to the electrical grid at a point of interconnection (POI), the system comprising: a generator and associated wind turbine controller configured with each of the wind turbines; a farm-level controller communicatively coupled to each of the wind turbine controllers, the farm-level controller comprising a processor for implement a plurality of first operations; the plurality of first operations comprising: receiving one or more grid signals having a characteristic indicative of a power system oscillation; generating an auxiliary signal from the grid signals; and using the auxiliary signal to modify a reactive power command transmitted to the wind turbine controllers to modulate reactive power output from the wind turbine generator to change a voltage at the POI, the voltage change damping the power system oscillations.

What is claimed is:

1. A method for damping power system oscillations in a power system network having one or more local inverter-based generators within a plant, the plant connected to a grid at a point of intersection (POI), the method comprising:
   at a plant-level controller, receiving one or more grid signals having a characteristic indicative of a power system oscillation;

at the plant-level controller, generating an auxiliary signal from the grid signals;

transmitting the auxiliary signal to a local controller of one or more of the inverter-based generators;

receiving a reactive power command signal at the local controller that is separate from the auxiliary signal and indicates a desired reactive power output from the inverter-based generators;

at the local controller, using the auxiliary signal to modulate the reactive power output from the inverter-based generators from that indicated by the reactive power command signal to improve damping of the power system oscillations.

2. The method as in claim 1, wherein the inverter-based generators are wind turbine generators and the plant is a wind farm connected to the grid at the POI.

3. The method as in claim 1, wherein voltage at the POI is changed in an increasing or decreasing direction to reduce the power system oscillations.

4. The method as in claim 1, wherein the grid signals are any one or combination of: an active or reactive power flow in one or more grid transmission lines, a current magnitude in one or more grid transmission lines, a voltage magnitude or angle at the POI, a voltage magnitude or angle at a remote bus, or a grid frequency.

5. The method as in claim 4, wherein a plurality of the grid signals are received at the plant-level controller, the auxiliary signal generated from a weighted combination of the plurality of the grid signals.

6. The method as in claim 1, wherein the auxiliary signal is applied to a summing junction of a voltage regulator in the local controller.

7. The method as in claim 1, wherein the generating of the auxiliary signal at the plant-level controller further comprises the plant level controller receiving capability limits at operating conditions of each of the inverter-based generators and adjusting the auxiliary signal to limit a change in reactive power ($\Delta Q$) utilized for damping, wherein the limit is calculated and implemented at the plant level or at each of the inverter-based generators as a percentage of the reactive power capability of the plant or inverter-based generators.

8. The method as in claim 7, further comprising utilizing a switchable washout filter having at least two washout filters with different time constants of a ($\Delta Q$) limiter, wherein when the ($\Delta Q$) limit is reached, output from the switchable washout filter is changed to the washout filter having a lower time constant.

9. The method as in claim 1, wherein the generating of the auxiliary signal at the plant-level controller further comprises applying a filter/gain control process having a first filter stage for lead-lag compensation and a second filter stage to provide increased flexibility in controller tuning.

10. The method as in claim 1, wherein the local controller comprises a voltage regulator that generates a reactive current command used for voltage regulation, the inverter-based generator having a defined maximum reactive current output, the auxiliary signal applied as an auxiliary voltage signal to the voltage regulator, and further comprising applying a voltage limiter to the auxiliary voltage signal such that reactive power used for damping is limited so as not to exceed a terminal voltage limit of the inverter-based generator.

11. The method as in claim 1, wherein the local controller comprises a reactive power regulator, the auxiliary signal applied as an auxiliary voltage signal to the reactive power regulator.

12. The method as in claim 11, further comprising applying a reactive power limier to the auxiliary voltage signal.

13. A method for controlling an inverter-based generator to damp power system oscillations, wherein the inverter-based generator is in a plant that is connected to a grid at a point of intersection (POI), the method comprising:

at a local controller configured with the inverter-based generator, generating an auxiliary signal from one or more grid signals having a characteristic indicative of a power system oscillation;

at the local controller, generating a reactive power command signal that is separate from the auxiliary signal and indicates a desired reactive power output from the inverter-based generator; and at the local controller, using the auxiliary signal to modulate reactive power output from the inverter-based generator from that indicated by the reactive power command signal to improve damping of the power system oscillations.

14. The method as in claim 13, wherein the inverter-based generator is a wind turbine generator within a wind farm having a plurality of the wind turbine generators, the wind farm connected to the grid at the POI.

15. A method for controlling an inverter-based generator to damp power system oscillations, wherein the inverter-based generator is in a plant that is connected to a grid at a point of intersection (POI), the method comprising:

at a plant controller configured with the inverter-based generator, generating an auxiliary signal, wherein the auxiliary signal is generated from one or more grid signals having a characteristic indicative of a power system oscillation;

at the plant controller, using the auxiliary signal to modify a reactive power command going to a local controller configured with the inverter-based generator to improve damping of the power system oscillations;

wherein the generating of the auxiliary signal at the plant-level controller further comprises the plant level controller receiving capability limits at operating conditions of each of the inverter-based generators and adjusting the auxiliary signal to limit a change in reactive power ($\Delta Q$) utilized for damping, wherein the limit is calculated and implemented at the plant level as a percentage of the reactive power capability of the plant or inverter-based generators; and further comprising utilizing a switchable washout filter having at least two washout filters with different time constants upstream of a ($\Delta Q$) limiter, wherein when the ($\Delta Q$) limit is reached, output from the switchable washout filter is changed to the washout filter having a lower time constant.

16. The method as in claim 15, wherein the inverter-based generator is a wind turbine generator within a wind farm having a plurality of the wind turbine generators, the wind farm connected to the grid at the POI.

17. The method as in claim 16, wherein the plant controller is a wind farm controller.

18. A system for controlling a wind farm to dampen power system oscillations on an electrical grid, the wind farm having a plurality of wind turbines electrically connected to the electrical grid at a point of interconnection (POI), the system comprising:

a generator and associated wind turbine controller configured with each of the wind turbines, the wind turbine controllers comprising a processor for implementing a plurality of first operations;

a farm-level controller communicatively coupled to each of the wind turbine controllers, the farm-level controller comprising a processor for implementing a plurality of second operations, the plurality of second operations comprising:
receiving one or more grid signals having a characteristic indicative of a power system oscillation;
generating an auxiliary signal from the grid signals;
transmitting the auxiliary signal to the wind turbine controllers;
the plurality of first operations at the wind turbine controllers comprising:
receiving a reactive power command signal at the wind turbine controller that is separate from the auxiliary signal and indicates a desired reactive power output from the wind turbine generator; and
using the auxiliary signal to modulate reactive power output from the wind turbine generator from that indicated by the reactive power command to change a voltage at the POI, the voltage change damping the power system oscillations.

19. A system for controlling a wind farm to dampen power system oscillations on an electrical grid, the wind farm having a plurality of wind turbines electrically connected to the electrical grid at a point of interconnection (POI), the system comprising:
a generator and associated wind turbine controller configured with each of the wind turbines, the wind turbine controllers comprising a processor for implementing a plurality of first operations;
a farm-level controller communicatively coupled to each of the wind turbine controllers;
the plurality of first operations comprising:
receiving one or more grid signals having a characteristic indicative of a power system oscillation;
generating an auxiliary signal from the grid signals;
generating a reactive power command signal that is separate from the auxiliary signal and indicates a desired reactive power output from the wind turbine generator; and
using the auxiliary signal to modulate reactive power output from the wind turbine generator from that indicated by the reactive power command signal to change a voltage at the POI, the voltage change damping the power system oscillations.

20. A system for controlling a wind farm to dampen power system oscillations on an electrical grid; the wind farm having a plurality of wind turbines electrically connected to the electrical grid at a point of interconnection (POI); the system comprising:
a generator and associated wind turbine controller configured with each of the wind turbines;
a farm-level controller communicatively coupled to each of the wind turbine controllers, the farm-level controller comprising a processor for implement a plurality of first operations;
the plurality of first operations comprising:
receiving one or more grid signals having a characteristic indicative of a power system oscillation;
generating an auxiliary signal from the grid signals;
using the auxiliary signal to modify a reactive power command transmitted to the wind turbine controllers to modulate reactive power output from the wind turbine generator to change a voltage at the POI, the voltage change damping the power system oscillations;
wherein the generating of the auxiliary signal at the farm-level controller further comprises the farm-level controller receiving capability limits at operating conditions of each of the inverter-based generators and adjusting the auxiliary signal to limit a change in reactive power ($\Delta Q$) utilized for damping, wherein the limit is calculated and implemented at the plant level as a percentage of the reactive power capability of the plant or inverter-based generators; and
further comprising utilizing a switchable washout filter having at least two washout filters with different time constants upstream of a ($\Delta Q$) limiter, wherein when the ($\Delta Q$) limit is reached, output from the switchable washout filter is changed to the washout filter having a lower time constant.

21. A method for damping power system oscillations in a power system network having one or more local inverter-based generators within a plant, the plant connected to a grid at a point of intersection (POI), the method comprising:
at a plant-level controller, receiving one or more grid signals having a characteristic indicative of a power system oscillation;
at the plant-level controller, generating an auxiliary signal from the grid signals;
transmitting the auxiliary signal to a local controller of one or more of the inverter-based generators;
at the local controller, using the auxiliary signal to modulate reactive power output from the inverter-based generators to improve damping of the power system oscillations;
wherein the grid signals are any one or combination of: an active or reactive power flow in one or more grid transmission lines, a current magnitude in one or more grid transmission lines, a voltage magnitude or angle at the POI, a voltage magnitude or angle at a remote bus, or a grid frequency; and
wherein a plurality of the grid signals are received at the plant-level controller, the auxiliary signal generated from a weighted combination of the plurality of the grid signals.

22. A method for damping power system oscillations in a power system network having one or more local inverter-based generators within a plant, the plant connected to a grid at a point of intersection (POI), the method comprising:
at a plant-level controller, receiving one or more grid signals having a characteristic indicative of a power system oscillation;
at the plant-level controller, generating an auxiliary signal from the grid signals;
transmitting the auxiliary signal to a local controller of one or more of the inverter-based generators;
at the local controller, using the auxiliary signal to modulate reactive power output from the inverter-based generators to improve damping of the power system oscillations;
wherein the generating of the auxiliary signal at, the plant-level controller further comprises the plant level controller receiving capability limits at operating conditions of each of the inverter-based generators and adjusting the auxiliary signal to limit a change in reactive power ($\Delta Q$) utilized for damping, wherein the limit is calculated and implemented at the plant level or at each of the inverter-based generators as a percentage of the reactive power capability of the plant or inverter-based generators; and
further comprising utilizing a switchable washout filter having at least two washout filters with different time constants upstream of a ($\Delta Q$) limiter, wherein when the ($\Delta Q$) limit is reached, output from the switchable washout filter is changed to the washout filter having a lower time constant.

* * * * *